(12) United States Patent
Suzue et al.

(10) Patent No.: US 11,932,710 B2
(45) Date of Patent: Mar. 19, 2024

(54) METHOD FOR DRYING POLYOLEFIN-CONTAINING PARTICLES

(71) Applicant: Sumitomo Chemical Company, Limited, Tokyo (JP)

(72) Inventors: Masato Suzue, Ichihara (JP); Satoshi Itoguchi, Ichihara (JP); Shohei Fukuhara, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 17/895,259

(22) Filed: Aug. 25, 2022

(65) Prior Publication Data

US 2023/0072052 A1  Mar. 9, 2023

(30) Foreign Application Priority Data

Aug. 30, 2021 (JP) ................. 2021-140254

(51) Int. Cl.
*C08F 10/06* (2006.01)
*C08J 3/12* (2006.01)

(52) U.S. Cl.
CPC ............... *C08F 10/06* (2013.01); *C08J 3/12* (2013.01); *C08J 2323/12* (2013.01); *C08J 2323/14* (2013.01)

(58) Field of Classification Search
CPC ................. C08F 6/28; C08F 6/10; C08F 6/08
See application file for complete search history.

(56) References Cited

U.S. PATENT DOCUMENTS

| 2015/0315302 | A1  | 11/2015 | Penzo et al. |
| 2019/0161605 | A1* | 5/2019  | Yamada ................ E02D 31/004 |
| 2020/0308317 | A1  | 10/2020 | Arakawa |
| 2021/0395504 | A1  | 12/2021 | Galgali et al. |

FOREIGN PATENT DOCUMENTS

| EP | 3647328 A1  | 5/2020 |
| JP | 2015537102 A | 12/2015 |
| JP | 2020164827 A | 10/2020 |

* cited by examiner

*Primary Examiner* — Catherine S Branch
(74) *Attorney, Agent, or Firm* — Panitch Schwarze Belisario & Nadel LLP

(57) ABSTRACT

A method for drying polyolefin-containing particles includes a drying step of supplying polyolefin-containing particles to a drying container, supplying a drying gas to the drying container, and drying the polyolefin-containing particles in the drying container. In the drying step, a numerical value determined by the following formula (a) is 441 or more and 600 or less.

38.0×[η]CXIS[dL/g]−0.500×CXIS content[% by mass]+1.20×particle temperature during drying [K]+3.29×drying time[hr]    Formula (a):

10 Claims, 1 Drawing Sheet

METHOD FOR DRYING POLYOLEFIN-CONTAINING PARTICLES

CROSS-REFERENCE TO RELATED APPLICATIONS

This application claims priority under 35 U.S.C. § 119(b) to Japanese Application No. 2021-140254, filed Aug. 30, 2021, the disclosure of which is incorporated herein by reference in its entirety.

BACKGROUND OF THE INVENTION

Field of the Invention

The present invention relates to a method for drying polyolefin-containing particles.

Description of the Related Art

A method for producing polyolefin-containing particles usually includes a step of drying (deaerating) the polyolefin-containing particles. Specifically, for example, a method for producing a polyolefin polymer, the method including a step of bringing polyolefin particles into contact with a nitrogen gas in a deaerating container to deaerate the polyolefin particles, is known (see JP-A-2015-537102).

SUMMARY OF THE INVENTION

However, it is difficult to say that the conventional drying (deaerating) step sufficiently removes a harmful volatile organic compound in a polyolefin to be produced.

As a result of intensive studies to solve the above problem, the present inventors have found that the above problem can be solved by drying polyolefin-containing particles so as to satisfy a predetermined requirement, and have completed the present invention.

That is, the present invention provides the following [1] to [10].

[1] A method for drying polyolefin-containing particles, comprising a drying step of supplying polyolefin-containing particles to a drying container, supplying a drying gas to the drying container, and drying the polyolefin-containing particles in the drying container, in which in the drying step, a numerical value determined by the following formula (a) is 441 or more and 600 or less.

$$38.0 \times [\eta]CXIS[dL/g] - 0.500 \times CXIS \text{ content}[\% \text{ by mass}] + 1.20 \times \text{particle temperature during drying}[K] + 3.29 \times \text{drying time}[hr] \quad \text{Formula (a):}$$

(In formula (a), $[\eta]$CXIS represents the limiting viscosity of a CXIS component in the polyolefin-containing particles, and the CXIS content represents the content of a CXIS component in the polyolefin-containing particles.)

[2] The method for drying polyolefin-containing particles according to [1], in which a ratio of the amount of the drying gas to the amount of the particles supplied to the drying container (amount of drying gas [kg]/amount of particles [kg]) is 0.1 or more and 100 or less.

[3] The method for drying polyolefin-containing particles according to [1] or [2], in which the particles are pellet-shaped particles.

[4] The method for drying polyolefin-containing particles according to any one of [1] to [3], in which the particles supplied into the drying container have a temperature of 25° C. or higher and 200° C. or lower.

[5] The method for drying polyolefin-containing particles according to any one of [1] to [4], in which the gas supplied to the drying container has a superficial velocity of 0.5 cm/s or more and 100 cm/s or less.

[6] The method for drying polyolefin-containing particles according to any one of [1] to [5], further comprising a granulation step of granulating the particles by a granulator including one or more vents before performing the drying step.

[7] The method for drying polyolefin-containing particles according to [6], further comprising a preliminary drying step before performing the granulation step.

[8] The method for drying polyolefin-containing particles according to [7], performed by setting conditions such that drying time in the preliminary drying step is at least 0.01 times drying time in the drying step, a particle temperature in the preliminary drying step is at least 0.5 times a particle temperature [K] during drying in the drying step, and a ratio of the amount of the drying gas to the amount of the particles supplied in the preliminary drying step (amount of drying gas [kg]/amount of particles [kg]) is at least 0.1 times a ratio of the amount of the drying gas to the amount of the particles supplied in the drying step (amount of drying gas [kg]/amount of particles [kg]).

[9] The method for drying polyolefin-containing particles according to any one of [1] to [8], in which the polyolefin is a propylene-based polymer.

A method for producing a polyolefin, comprising a step of drying polyolefin-containing particles by the drying method according to any one of [1] to [9].

According to a method for drying polyolefin-containing particles according to the present invention, even when a large number of particles are dried, the particles can be stably dried without causing the particles to adhere to each other, and polyolefin-containing particles in which the content of a harmful volatile organic compound is effectively reduced can be provided.

DETAILED DESCRIPTION OF THE PREFERRED EMBODIMENTS

Figure 1:
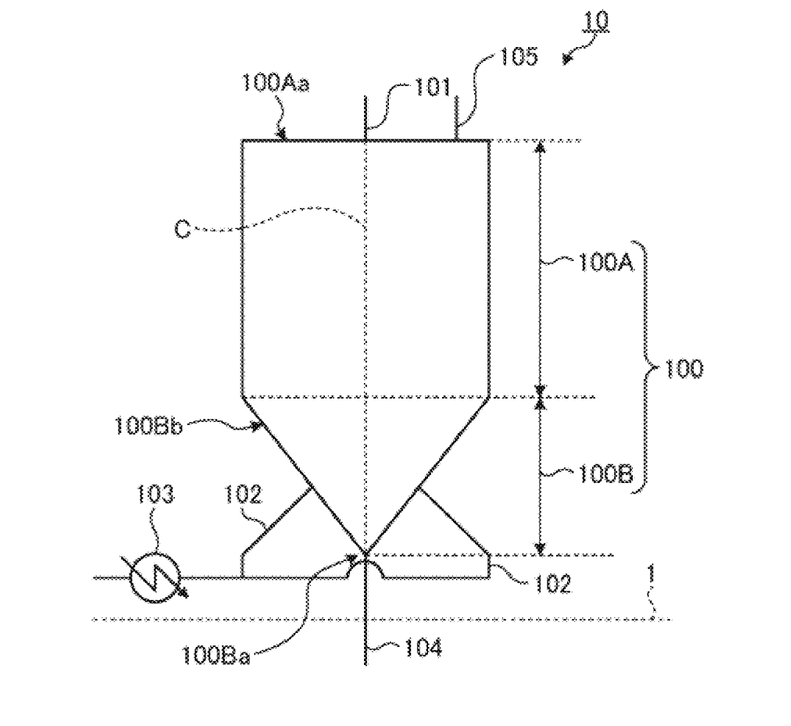
The FIGURE is a schematic diagram for explaining a configuration of a drying container.

Hereinafter, an embodiment of the present invention will be described with reference to the drawings. Note that each of the drawings merely schematically illustrates the shapes, sizes, and arrangement of components to such an extent that the invention can be understood. The present invention is not limited by the following description, and each of the components can be modified without departing from the gist of the present invention. In the following drawings, redundant descriptions of reference numerals used for the same component may be omitted.

In the present specification, "polyolefin-containing particles" means particles containing 50% by mass or more of polyolefin, and particles containing 80% by mass or more of polyolefin are preferable, and particles containing 95% by mass or more of polyolefin are more preferable. Here, examples of "polyolefin" include a propylene-based polymer, an ethylene-based polymer, and a butene-based polymer. Preferred examples of "polyolefin" include a propylene-based polymer. "Polyolefin-containing particles" may contain only one type of polyolefin or two or more types of polyolefins. When a propylene-based polymer is contained as the polyolefin in the "polyolefin-containing particles", the content of the propylene-based polymer in the polyolefin is preferably 30% by mass or more, more preferably 60% by mass or more, and still more preferably 90% by mass or more.

In the present specification, "α-olefin" means an aliphatic unsaturated hydrocarbon having a carbon-carbon unsaturated double bond at an α-position.

In the present specification, "heterophasic propylene polymerization material" means a mixture having a structure in which a propylene copolymer containing a monomer unit derived from at least one type of α-olefin selected from the group consisting of ethylene and α-olefins having 4 to 12 carbon atoms and a monomer unit derived from propylene is dispersed in a matrix of a propylene-based polymer containing 80% by mass or more of a monomer unit (structural unit) derived from propylene (in which the total mass of the propylene-based polymer is 100% by mass).

In the present specification, "AA to BB" means AA or more and BB or less. Here, AA and BB each represent a numerical value, and AA<BB. The unit of AA is the same as the unit described immediately after BB unless otherwise specified.

In the present specification, the term "monomer unit" means a structural unit having a structure obtained by polymerizing the monomer.

In the present specification, a limiting viscosity (unit: dL/g) is a value measured at a temperature of 135° C. using tetralin as a solvent by the following method.

Using an Ubbelohde viscometer, values of reduced viscosity are measured for a plurality of concentrations, the values of reduced viscosity are plotted with respect to the concentrations, respectively, and a limiting viscosity number is determined by an "extrapolation method" in which a concentration is extrapolated to zero. More specifically, using the method described on page 491 of "Polymer Solution, Polymer Experiment 11" (published by KYO-RITSU SHUPPAN CO., LTD., 1982), values of reduced viscosity are measured for three points of concentrations of 0.1 g/dL, 0.2 g/dL, and 0.5 g/dL, respectively, the values of reduced viscosity are plotted with respect to the concentrations, respectively, and a limiting viscosity number is determined by a method in which a concentration is extrapolated to zero.

1. Method for Drying Polyolefin-Containing Particles

A method for drying polyolefin-containing particles according to the present embodiment includes a drying step of supplying polyolefin-containing particles to a drying container, supplying a drying gas to the drying container, and drying the polyolefin-containing particles in the drying container, and in the drying step, a numerical value determined by the following formula (a) is 441 or more and 600 or less.

$$38.0 \times [\eta]CXIS[dL/g] - 0.500 \times CXIS \text{ content}[\% \text{ by mass}] + 1.20 \times \text{particle temperature during drying}[K] + 3.29 \times \text{drying time}[hr] \quad \text{Formula (a):}$$

(In formula (a),
$[\eta]$CXIS represents the limiting viscosity of a CXIS component in the polyolefin-containing particles, and
the CXIS content represents the content of a CXIS component in the polyolefin-containing particles.)

In the present embodiment, the properties of the "polyolefin-containing particles" are not particularly limited. The "polyolefin-containing particles" are preferably in a form of pellets (particles), and may be in a form of a so-called powder.

Here, first, the propylene-based polymer that can constitute the "polyolefin-containing particles" will be described.

(1) Propylene-Based Polymer

The propylene-based polymer is a polymer containing a propylene unit in an amount of more than 50% by mass with respect to all structural units of the polymer. The content of the propylene unit in the propylene-based polymer is usually 100% by mass or less.

Examples of the propylene-based polymer include a propylene homopolymer and a copolymer of propylene and another monomer copolymerizable with propylene. The copolymer may be a random copolymer or a block copolymer. The random copolymer is a polymer which a monomer unit derived from at least one type of α-olefin selected from the group consisting of ethylene and α-olefins having 4 to 12 carbon atoms and a monomer unit derived from propylene are randomly connected. The block copolymer is a polymer comprising blocks in which monomer units derived from at least one type of α-olefin selected from the group consisting of ethylene and α-olefins having 4 to 12 carbon atoms are continuously linked, and blocks in which monomer units derived from propylene are continuously linked.

The propylene-based polymer may contain only one type of propylene-based polymer, or may contain two or more types of propylene-based polymers in an arbitrary combination.

Examples of the propylene-based polymer containing only one type of propylene-based polymer include a propylene homopolymer and a random copolymer of propylene and another monomer copolymerizable with propylene (hereinafter, also referred to as a propylene copolymer).

In the present embodiment, the propylene-based polymer is preferably a heterophasic propylene polymerization material. Here, the heterophasic propylene polymerization material means a material containing two or more types of propylene-based polymers, in which the two or more types of propylene-based polymers are incompatible with each other and form different phases. Here, the heterophasic propylene polymerization material in the present embodiment will be specifically described.

(Heterophasic Propylene Polymerization Material)

The heterophasic propylene polymerization material in the present embodiment is a heterophasic propylene polymerization material containing a propylene-based polymer a and a propylene copolymer b. The propylene-based polymer a preferably contains 80% by mass or more of a monomer unit derived from propylene, and the propylene copolymer b preferably contains 20 to 70% by mass of a monomer unit derived from at least one type of α-olefin selected from the group consisting of ethylene and α-olefins having 4 to 12 carbon atoms and a monomer unit derived from propylene.

The propylene-based polymer a may be, for example, a propylene homopolymer, or may contain a monomer unit derived from a monomer other than propylene. When the propylene-based polymer a contains a monomer unit derived from a monomer other than propylene, the content thereof may be, for example, 0.01% by mass or more and less than 20% by mass based on the total mass of the propylene-based polymer a.

Examples of the monomer other than propylene include ethylene and α-olefins having 4 to 12 carbon atoms. Among these, at least one type selected from the group consisting of ethylene and α-olefins having 4 to 10 carbon atoms is preferable, at least one type selected from the group consisting of ethylene, 1-butene, 1-hexene, and 1-octene is more preferable, and at least one type selected from the group consisting of ethylene and 1-butene is still more preferable.

Examples of the propylene-based polymer containing a monomer unit derived from a monomer other than propylene include a propylene-ethylene copolymer, a propylene-1-butene copolymer, a propylene-1-hexene copolymer, a propylene-1-octene copolymer, a propylene-ethylene-1-butene copolymer, a propylene-ethylene-1-hexene copolymer, and a propylene-ethylene-1-octene copolymer.

As the propylene-based polymer a, a propylene homopolymer, a propylene-ethylene copolymer, a propylene-1-butene copolymer, or a propylene-ethylene-1-butene copolymer is preferable, and a propylene homopolymer is more preferable.

The heterophasic propylene polymerization material in the present embodiment may contain only one type of propylene-based polymer a, or may contain two or more types of propylene-based polymers a.

In the propylene copolymer b, the content of a monomer unit derived from at least one type of α-olefin selected from the group consisting of ethylene and α-olefins having 4 to 12 carbon atoms may be 20 to 70% by mass, 30 to 60% by mass, or 35 to 55% by mass.

In the propylene copolymer b, as the at least one type of α-olefin selected from the group consisting of ethylene and α-olefins having 4 to 12 carbon atoms, at least one type selected from the group consisting of ethylene and α-olefins having 4 to 10 carbon atoms is preferable, at least one type selected from the group consisting of ethylene, 1-butene, 1-hexene, 1-octene, and 1-decene is more preferable, and at least one type selected from the group consisting of ethylene and 1-butene is still more preferable.

Examples of the propylene copolymer b include a propylene-ethylene copolymer, a propylene-ethylene-1-butene copolymer, a propylene-ethylene-1-hexene copolymer, a propylene-ethylene-1-octene copolymer, a propylene-ethylene-1-decene copolymer, a propylene-1-butene copolymer, a propylene-1-hexene copolymer, a propylene octene copolymer, and a propylene-1-decene copolymer. Among these, as the propylene copolymer b, a propylene-ethylene copolymer, a propylene-1-butene copolymer, or a propylene-ethylene-1-butene copolymer is preferable, and a propylene-ethylene copolymer is more preferable.

The heterophasic propylene polymerization material in the present embodiment may contain only one type of propylene copolymer b, or may contain two or more types of propylene copolymers b.

Examples of the heterophasic propylene polymerization material in the present embodiment include a (propylene)-(propylene-ethylene) polymerization material, a (propylene)-(propylene-ethylene-1-butene) polymerization material, a (propylene)-(propylene-ethylene-1-hexene) polymerization material, a (propylene)-(propylene-ethylene-1-octene) polymerization material, a (propylene)-(propylene-1-butene) polymerization material, a (propylene)-(propylene-1-hexene) polymerization material, a (propylene)-(propylene-1-octene) polymerization material, a (propylene)-(propylene-1-decene) polymerization material, a (propylene-ethylene)-(propylene-ethylene) polymerization material, a (propylene-ethylene)-(propylene-ethylene butene) polymerization material, a (propylene-ethylene)-(propylene-ethylene-1-hexene) polymerization material, a (propylene-ethylene)-(propylene-ethylene-1-octene) polymerization material, a (propylene-ethylene)-(propylene-ethylene-1-decene) polymerization material, a (propylene-ethylene)-(propylene-1-butene) polymerization material, a (propylene-ethylene)-(propylene-1-hexene) polymerization material, a (propylene-ethylene)-(propylene-1-octene) polymerization material, a (propylene-ethylene)-(propylene-1-decene) polymerization material, a (propylene-1-butene)-(propylene-ethylene-1-butene) polymerization material, a (propylene-1-butene)-(propylene-ethylene-1-hexene) polymerization material, a (propylene-1-butene)-(propylene-ethylene-1-octene) polymerization material, a (propylene-1-butene)-(propylene-ethylene-1-decene) polymerization material, (propylene-1-butene)-(propylene-1-butene) polymerization material, a (propylene-1-butene)-(propylene-1-hexene) polymerization material, a (propylene-1-butene)-(propylene-1-octene) polymerization material, a (propylene-1-butene)-(propylene-1-decene) polymerization material, a (propylene-1-hexene)-(propylene-1-hexene) polymerization material, a (propylene-1-hexene)-(propylene-1-octene) polymerization material, a (propylene-1-hexene)-(propylene-1-decene) polymerization material, a (propylene-1-octene)-(propylene-1-octene) polymerization material, and a (propylene-1-octene)-(propylene-1-decene) polymerization material. Among these, a (propylene)-(propylene-ethylene) polymerization material, a (propylene)-(propylene-ethylene-1-butene) polymerization material, a (propylene-ethylene)-(propylene-ethylene) polymerization material, a (propylene-ethylene)-(propylene-ethylene-1-butene) polymerization material, or a (propylene-1-butene)-(propylene-1-butene) polymerization material is preferable, and a (propylene)-(propylene-ethylene) polymerization material is more preferable.

Here, the above description represents "(type of propylene-based polymer containing 80% by mass or more of a monomer unit derived from propylene)-(type of propylene copolymer b)". That is, the description of "(propylene)-(propylene-ethylene) polymerization material" represents a "heterophasic propylene polymerization material in which the propylene-based polymer a is a propylene homopolymer and the propylene copolymer b is a propylene-ethylene copolymer". Hereinafter, the same applies to other similar expressions.

(2) Method for Producing Heterophasic Propylene Polymerization Material

A method for producing a propylene-based polymer containing 80% by mass or more of a monomer unit derived from propylene, which can be contained in the heterophasic propylene polymerization material, preferably includes the following step 1, that is, steps 1-a and 1-b. In addition, the method for producing the heterophasic propylene polymerization material preferably includes the following steps 1 and 2.

(Step 1-a)

In step 1-a, for example, monomers containing propylene are polymerized in the presence of a polymerization catalyst and hydrogen using a liquid phase polymerization reactor. The composition of the monomers used for polymerization only needs to be appropriately adjusted based on the types and contents of monomer units constituting the propylene-based polymer a. The content of propylene in the monomers may be, for example, 80% by mass or more, 90% by mass or more, or 100% by mass with respect to the total mass of the monomers.

Examples of the liquid phase polymerization reactor include a loop type liquid phase reactor and a vessel type liquid phase reactor.

Examples of the polymerization catalyst include a Ziegler-Natta type catalyst and a metallocene-based catalyst, and the Ziegler-Matta type catalyst is preferable. Examples of the Ziegler-Matta type catalyst include a Ti—Mg-based catalyst such as a solid catalyst component obtained by bringing a titanium compound into contact with a magnesium compound, and a catalyst containing a solid catalyst component obtained by bringing a titanium compound into contact with a magnesium compound, an organoaluminum compound, and if necessary, a third component such as an electron donating compound. A catalyst containing a solid catalyst component obtained by bringing a titanium compound into contact with a magnesium compound, an organoaluminum compound, and if necessary, a third component such as an electron donating compound is preferable. A catalyst containing a solid catalyst component obtained by bringing a titanium halide compound into contact with a magnesium compound, an organoaluminum compound, and an electron donating compound is more preferable. A catalyst with which a small amount of olefin is brought into contact and which is preliminarily activated can also be used as the polymerization catalyst.

As the polymerization catalyst, a preliminary polymerization catalyst component obtained by prepolymerizing an olefin in the presence of the solid catalyst component, n-hexane, triethylaluminum, tert-butyl-n-propyldimethoxysilane, or the like can also be used. The olefin used in the preliminary polymerization is preferably any of olefins constituting the heterophasic propylene polymerization material.

A polymerization temperature can be, for example, 0 to 120° C. A polymerization pressure can be, for example, normal pressure to 10 MPaG.

(Step 1-b)

In step 1-b, for example, monomers containing propylene are polymerized in the presence of a polymerization catalyst and hydrogen using a gas phase polymerization reactor. The composition of the monomers used for polymerization can be appropriately adjusted based on the types and contents of monomer units constituting the propylene-based polymer a. The content of propylene in the monomers may be, for example, 80% by mass or more, 90% by mass or more, or 100% by mass with respect to the total mass of the monomers.

Examples of the gas phase polymerization reactor include a fluidized bed type reactor and a spouted bed type reactor.

The gas phase polymerization reactor may be a multi-stage gas phase polymerization reactor having a plurality of reaction regions connected in series. The multi-stage gas phase polymerization reactor may be a multi-stage gas phase polymerization reactor having a plurality of polymerization tanks connected in series.

The multi-stage gas phase polymerization reactor includes, for example, a cylindrical portion extending in the vertical direction, and a conical reduced diameter portion that is integrally formed with the cylindrical portion, has a smaller inner diameter as it goes vertically downward, and has a gas introduction opening at a lower end, and can have a spouted bed type olefin polymerization reaction region which is surrounded by an inner surface of the reduced diameter portion and an inner surface of the cylindrical portion above the reduced diameter portion and in which a spouted bed is formed, and a fluidized bed type olefin polymerization reaction region.

The multi-stage gas phase polymerization reactor preferably has a plurality of reaction regions in the vertical direction. The multi-stage gas phase polymerization reactor preferably has, for example, a plurality of reaction regions in the vertical direction, in which the uppermost stage is a fluidized bed type olefin polymerization reaction region and the rest is a plurality of spouted bed type olefin polymerization reaction regions from a viewpoint of optimizing the limiting viscosity of the propylene-based polymer a. In such a reactor, for example, by supplying a solid component such as a catalyst from an upper side of the reactor, and supplying a gas component from a lower side of the reactor, a fluidized bed or a spouted bed is formed in a reaction region. The gas component may contain an inert gas such as a nitrogen gas in addition to monomers containing propylene and hydrogen. In the reactor, the number of the spouted bed type olefin polymerization reaction regions is preferably 3 or more.

In the multi-stage gas phase polymerization reactor, when a plurality of reaction regions is disposed in the vertical direction, a reaction region at a lower stage may be disposed in an obliquely downward direction of a reaction region at an upper stage. In such a reactor, for example, a solid component obtained in the reaction region at the upper stage is discharged in an obliquely downward direction, and the discharged solid component is supplied to the reaction region at the lower stage from an obliquely upward direction. In this case, for example, a gas component discharged from an upper part of the reaction region at the lower stage is supplied from a lower part of the reaction region at the upper stage.

Specific examples of the polymerization catalyst that can be used in the multi-stage gas phase polymerization reactor are similar to those of the polymerization catalyst described above.

A polymerization temperature may be, for example, 0 to 120° C., 20 to 100° C., or 40 to 100° C. A polymerization pressure may be, for example, normal pressure to 10 MPaG or 1 to 5 MPaG.

(Step 2)

Step 2 can be performed in both a gas phase and a liquid phase. Step 2 is preferably performed in a gas phase. When step 2 is performed in a gas phase, for example, a gas phase reactor such as a fluidized bed type reactor or a spouted bed type reactor can be used. When step 2 is performed in a liquid phase, for example, a liquid phase reactor such as a loop type or a vessel type can be used.

In step 2, for example, using a polymerization catalyst similar to the polymerization catalyst described above, monomers containing propylene and at least one type of α-olefin selected from the group consisting of α-olefins having 4 to 12 carbon atoms can be polymerized in the presence of hydrogen. The composition of the monomers used for polymerization only needs to be appropriately adjusted based on the types and contents of monomer units constituting the propylene copolymer b. The content of at least one type of α-olefin selected from the group consisting of α-olefins having 4 to 12 carbon atoms among the monomers used for polymerization may be, for example, 20 to 70% by mass or 30 to 60% by mass.

When polymerization is performed in a liquid phase, a polymerization temperature is, for example, 40 to 100° C., and a polymerization pressure is, for example, normal pressure to 5 MPaG. When polymerization is performed in a gas phase, a polymerization temperature is, for example, 40 to 100° C., and a polymerization pressure is, for example, 0.5 to 5 MPaG.

The propylene-based polymer a and the propylene copolymer b may be prepared in steps separated from each other, the polymerization catalyst may be deactivated, and then the propylene-based polymer a and the propylene copolymer b may be mixed in a solution state, a molten state, or the like. In addition, by supplying an obtained polymer to a next step without deactivating the polymerization catalyst, the polymerization may be continuously performed. When the polymerization is continuously performed without deactivating the polymerization catalyst, the polymerization catalyst in the previous step can usually also function as a polymerization catalyst in the subsequent step.

The order of performing steps 1 and 2 is not particularly limited. Step 1 preferably includes steps 1-a and 1-b as described above. The polymerization steps 1 and steps 2 is not limited in the presence of hydrogen, in which the polymerization steps 1 and steps 2 may be performed in absence of hydrogen.

The method for producing a heterophasic propylene polymerization material according to the present embodiment preferably includes steps 1-a, 1-b, and 2 in this order.

(Solid-Gas Separation Step and Catalyst Deactivation Step)

The propylene-based polymer (heterophasic propylene polymerization material) obtained by the above steps is subjected to a solid-gas separation step and a catalyst deactivation step. Specifically, by transferring the reaction mixture containing the propylene-based polymer from the polymerization reactor to a solid-gas separation container having any conventionally known suitable configuration, and for example, supplying water vapor (steam) and a nitrogen gas from a bottom side of the solid-gas separation container, the catalyst deactivation step of deactivating a solid catalyst component can be performed together with the solid-gas separation step.

(3) Propylene-Based Polymer-Containing Particles

In the present embodiment, the propylene-based polymer-containing particles (heterophasic propylene polymerization material-containing particles) may further contain any conventionally known suitable additive such as a heat stabilizer, an ultraviolet stabilizer, an antioxidant, a crystal nucleating agent, a lubricant, a colorant, an antiblocking agent, an antistatic agent, an antifogging agent, a flame retardant, a petroleum resin, a foaming agent, a foaming aid, an organic filler, or an inorganic filler as necessary.

The addition amount of the additive is preferably 0.01% by mass or more and 30% by mass or less with respect to the whole amount (100% by mass) of the propylene-based polymer-containing particles (heterophasic propylene polymerization material-containing particles). One type of additive may be used singly, or two or more types of additives may be used in combination.

(4) Method for Drying Propylene-Based Polymer-Containing Particles

A method for drying polyolefin-containing particles (also simply referred to as "particles") according to the present embodiment includes a drying step of supplying propylene-based polymer-containing particles to a drying container, supplying a drying gas to the drying container, and drying the propylene-based polymer-containing particles in the drying container.

The particle drying step in the present embodiment can include a preliminary drying step and a main drying step.

Here, first, a configuration example of a drying container applied to the drying step, that is, the preliminary drying step and the main drying step described later will be described with reference to the FIGURE. In the following description, a configuration example in which a body portion of the drying container is a cylindrical portion will be described, but the present invention is not limited thereto. The shape and the like of the drying container, particularly the shape and the like of the body portion can be any suitable shape and the like according to design, such as a rectangular parallelepiped outer shape, as log as the effects of the present invention are not impaired.

The FIGURE is a schematic diagram for explaining the configuration of the drying container.

As illustrated in the FIGURE, a drying container 10 includes a hollow drying container 100 including a cylindrical portion 100A and a conical portion 100B integrally connected to the cylindrical portion 100A and having an apex 100Ba and an inclined surface 100Bb.

In use, the drying container 100 is disposed such that the apex 100Ba of the conical portion 100B is a lower end portion in the vertical direction, and an end portion of the cylindrical portion 100A on a side opposite to a side where the conical portion 100B is connected is an upper end portion 100Aa. More specifically, the drying container 100 is installed such that a central axis C passing through the apex 100Ba of the conical portion 100B and the center of the upper end portion 100Aa of the cylindrical portion 100A is orthogonal to an installation surface 1 which is a horizontal plane.

To the upper end portion 100Aa of the cylindrical portion 100A of the drying container 100, a particle supply line 101 is connected. The particle supply line 101 is configured to introduce polyolefin-containing particles, more specifically, a drying target, for example, a propylene-based polymer such as a heterophasic propylene polymerization material or propylene-based polymer-containing particles into the drying container 100.

To the upper end portion 100Aa of the cylindrical portion 100A of the drying container 100, a drying gas discharge line 105 is connected. The drying gas discharge line 105 is configured to discharge a drying gas introduced into the drying container 100 from a drying gas supply line 102 described later and used for drying a drying target to the outside of the drying container 100.

To the apex 100Ba of the conical portion 100B of the drying container 100, a particle discharge line 104 is connected. The particle discharge line 104 is configured to discharge a drying target that has been subjected to a drying treatment to the outside of the drying container 100.

To the inclined surface 100Bb of the conical portion 100B of the drying container 100, the drying gas supply line 102 is connected. In this configuration example, the drying gas supply line 102 branches into two lines, and the two lines are connected to two places of the inclined surface 100Bb, respectively. The drying gas supply line 102 is configured to supply a drying gas into the container 100 and bringing the drying gas into contact with a drying target to dry the drying target.

On an upstream side of the branching point of the two drying gas supply lines 102, a heat exchanger 103 is disposed. The heat exchanger 103 is configured to heat a drying gas supplied to the drying container 100 through the drying gas supply line 102 to raise the temperature to a predetermined temperature. As the heat exchanger 103, any conventionally known suitable device can be selected and used.

The particle supply line 101, the particle discharge line 104, the drying gas supply line 102, and the drying gas discharge line 105 can each have any conventionally known suitable configuration including a pipe, a valve, and the like. In addition, the particle supply line 101, the particle discharge line 104, the drying gas supply line 102, and the drying gas discharge line 105 can be each configured so as to have any suitable arrangement, shape, and size according to a desired aspect.

(Preliminary Drying Step)

In the particle drying method of the present embodiment, when the particles are in a form of pellets, a granulation step described later is performed. In this case, the particle drying method of the present embodiment preferably further includes a preliminary drying step before performing the granulation step.

The preliminary drying step and the drying step (main drying step described later) are preferably performed by setting conditions such that drying time in the preliminary drying step is at least 0.01 times drying time in the drying step (main drying step described later). That is, the drying time in the preliminary drying step is preferably shorter than the drying time in the main drying step described later.

In the present embodiment, the preliminary drying step and the drying step (main drying step described later) are preferably performed as a batch drying step or a continuous drying step. Here, the batch drying step is a step of supplying particles into the drying container 100, bringing a drying gas into contact with the drying target for an arbitrary time to dry the drying target, and discharging the dried drying target (particles) to the outside of the drying container 100, and the continuous drying step is a step of storing an arbitrary amount of a drying target (particles) in the drying container 100, then supplying the particles into the drying container 100 at an arbitrary supply rate, supplying a drying gas to the drying container, and discharging the dried particles to the outside of the drying container 100 at an arbitrary discharge rate while bringing the particles in the drying container 100 into contact with the drying gas.

The preliminary drying step and the main drying step are preferably performed by setting conditions such that a particle temperature in the preliminary drying step is at least 0.5 times a particle temperature [K] during drying in the main drying step. That is, the particle temperature in the preliminary drying step is preferably lower than the particle temperature in the main drying step.

Here, the temperature of the particles during drying in the preliminary drying step and the drying step is preferably equal to or lower than the melting point of a polyolefin which is a main component constituting the particles. For example, when the particles contain a plurality of types of polyolefins, it is preferable to set conditions of the preliminary drying step and the drying step such that the temperature of the particles is equal to or lower than the melting point of a polyolefin having the highest content in the particles.

The preliminary drying step and the main drying step are preferably performed by setting conditions such that a ratio of the amount of the drying gas to the amount of the particles supplied in the preliminary drying step (amount of drying gas [kg]/amount of particles [kg]) is at least 0.1 times a ratio of the amount of the drying gas to the amount of the particles supplied in the main drying step (amount of drying gas [kg]/amount of particles [kg]).

Here, when the preliminary drying step is a batch drying step, the "amount of the particles supplied" is the total amount [kg] of the particles supplied to the drying container in performing the batch drying step, and the "amount of the drying gas" is the total supply amount [kg] of the drying gas supplied to the drying container during the batch drying step.

When the preliminary drying step is a continuous drying step, the "amount of the particles supplied" is an average amount [kg/hr] of the particles per unit time supplied to the drying container during the continuous drying step after a predetermined amount of the drying target (particles) is stored in the drying container, and the "amount of the drying gas" is an average amount [kg/hr] of the drying gas per unit time supplied to the drying container during the continuous drying step in which the drying target (particles) is supplied.

In the present embodiment, as the drying gas supplied to the drying container, any conventionally known suitable gas can be used. As the drying gas, an inert gas such as a nitrogen gas or air is preferably used. In particular, in the preliminary drying step, an inert gas such as nitrogen gas is preferably used because there is a possibility that a residual solvent is present, and in the main drying step, air is preferably used because the drying gas may be used in a larger amount than in the preliminary drying step.

In the preliminary drying step (and the main drying step described later) in the present embodiment, "superficial velocity [m/s]" of the drying gas means a velocity that can be calculated by dividing a total flow rate [m$^3$/s] of the drying gas supplied to the drying container by the area [m$^2$] of a cross section (circular shape in a case of the cylindrical portion) extending in a direction orthogonal to an extending direction (vertical direction) of the body portion (cylindrical portion) of the drying container in a flowing direction of the drying gas. Note that when the cross section extending in the direction orthogonal to the extending direction (vertical direction) of the body portion of the drying container in the flowing direction of the drying gas changes depending on the height of the body portion in the extending direction, the area [m$^2$] of the cross section is a value obtained by dividing the volume of the drying container by the height of the drying container in the extending direction.

In the present embodiment, a step of cooling the particles under any suitable conditions may be further performed between the preliminary drying step and the granulation step described later or between the preliminary drying step and the main drying step described later.

(Granulation Step)

A granulation step in the present embodiment can be performed using any conventionally known suitable granulator.

The particles in the present embodiment can be produced by, for example, melt-kneading the propylene-based polymer and the additive described above as raw material components. A temperature at the time of melt kneading may be 180° C. or higher, 180 to 300° C., or 180 to 250° C.

Examples of the granulator particularly for producing pellet-shaped particles in the present embodiment include a Banbury mixer, a single screw extruder, and a twin screw co-rotating extruder.

The order of kneading the raw material components is not particularly limited. For example, all the raw material components may be collectively put into the granulator and kneaded, or some of the selected raw material components may be kneaded, and then the obtained kneaded product and the other raw material components may be kneaded.

In the present embodiment, the granulator used in the granulation step preferably includes one or more vents. Here, the vent is a functional unit capable of discharging a gas and a volatile component in the granulator to the outside of the system to remove the gas and the volatile component, and in particular, a vacuum vent is a functional unit capable of actively discharging the gas and the volatile component in the granulator to the outside of the system and decompressing the inside of the granulator to remove the gas and the volatile component. The vent in the present embodiment may have any conventionally known suitable configuration.

In the present embodiment, the vent that can be included in the granulator may be an atmospheric vent or a vacuum vent, or may be a combination of the atmospheric vent and the vacuum vent.

In the present embodiment, at least one of the one or more vents that can be included in the granulator is preferably a vacuum vent.

When the granulator includes at least one vacuum vent, the granulation step is preferably performed by reducing the pressure in the granulator to −95 kPa or more and −5 kPa or less by the vacuum vent.

(Main Drying Step)

When the preliminary drying step and the granulation step are performed, the main drying step (drying step) is performed using the drying device described above after these steps.

In the main drying step (drying step) in the present embodiment, the temperature of the particles supplied into the drying container is preferably 25° C. or higher and 200° C. or lower. The temperature of the particles supplied into the drying container is more preferably 100° C. or lower.

Here, the "temperature of the particles supplied into the drying container" means the temperature of the particles immediately before the particles are supplied into the drying container, and when the particles are supplied to the drying container by in-line air transfer, the "temperature of the particles supplied into the drying container" means the particle temperature before the air transfer.

In the main drying step (drying step) in the present embodiment, the temperature of the particles dried in the drying container (particle temperature during drying) is preferably 50° C. or higher and 200° C. or lower. The temperature of the particles supplied into the drying container is more preferably 80° C. or higher, and still more preferably 100° C. or higher. In addition, the temperature of the particles supplied into the drying container is more preferably 160° C. or lower and still more preferably 125° C. or lower.

Here, when the drying step is a batch drying step, the "particle temperature during drying" means an average particle temperature in the drying container during a period from completion of supplying the particles into the drying container and start of supplying the drying gas into the drying container to start of discharging the particles from the drying container. Note that the particle temperature can be obtained by measuring a temperature of a particle-filled region in the drying container, and when the temperatures at a plurality of places in the drying container are measured, it is only required to adopt an average value of the temperatures as the particle temperature during drying.

When the drying step is a continuous drying step, the "particle temperature during drying" means an average temperature of the particles present in the drying container during a period in which the particles are continuously supplied into the drying container at a predetermined rate (flow rate), and continuously discharged out of the drying container at a predetermined rate (flow rate) to be continuously dried. Note that the particle temperature can be obtained by measuring a temperature of a particle-filled region in the drying container, and when the temperatures at a plurality of places in the drying container are measured, it is only required to adopt an average value of the temperatures as the particle temperature during drying.

In the main drying step (drying step) in the present embodiment, the gas supplied to the drying container preferably has superficial velocity of 0.5 cm/s or more and 100 cm/s or less. The superficial velocity of the gas supplied to the drying container is more preferably 50 cm/s or less from a viewpoint of suppressing scattering of the particles to the outside of the drying container.

In the main drying step (drying step) in the present embodiment, drying time is preferably 0.2 hours or more and 48 hours or less. The drying time is more preferably 1.0 hour or more, and still more preferably 5.0 hours or more. The drying time is more preferably 24 hours or less, and still more preferably 15 hours or less.

Here, when the drying step is a batch drying step, the "drying time" means a total time from completion of supplying the particles into the drying container and start of supplying the drying gas into the drying container to start of discharging the dried particles to the outside of the drying container, and when the drying step is a continuous drying step, the "drying time" means a value calculated by dividing an average value [kg] of the retention amount of the particles in the drying container during the continuous drying step by an average value of the discharge rate [kg/hour] of the particles discharged from the drying container during the continuous drying step. Note that "during the continuous drying step" means a period from a start time point to an end time point, in which the start time point is a time point at which a drying gas is supplied into a drying container in a state where a predetermined amount of particles are present in the drying container, the particles are supplied into the drying container, and the dried particles are discharged to the outside of the drying container, and the end time point is a time point at which the supply of the particles into the drying container and the discharge of the particles to the outside of the drying container are stopped.

A ratio of the amount of the drying gas to the amount of the particles supplied to the drying container (amount [kg] of drying gas/amount [kg] of particles) is preferably 0.1 or more and 100 or less, more preferably 0.3 or more, still more preferably 1.0 or more, and more preferably 75 or less, still more preferably 50 or less.

Here, when the drying step is a batch drying step, the "ratio of the amount of the drying gas to the amount of the particles supplied to the drying container (amount [kg] of drying gas/amount [kg] of particles)" means a ratio of the total supply amount [kg] of the drying gas supplied to the drying container during the batch drying step to the total amount [kg] of the particles supplied to the drying container in performing the batch drying step, and when the drying step is a continuous drying step, the "ratio of the amount of the drying gas to the amount of the particles supplied to the drying container (amount [kg] of drying gas/amount [kg] of particles)" means a ratio of an average amount [kg/hour] of the drying gas per unit time supplied to the drying container during the continuous drying step to an average amount [kg/hour] of the particles per unit time supplied to the drying container during the continuous drying step after a predetermined amount of the drying target (particles) is stored in the drying container.

In the drying step in the present embodiment, a numerical value determined by the following formula (a) is preferably 441 or more and 600 or less, and a lower limit of the numerical value is more preferably 460 or more, and still more preferably 480 or more. An upper limit of the numerical value is more preferably 580 or less, and still more preferably 560 or less.

$$38.0 \times [\eta]CXIS[dL/g] - 0.500 \times CXIS\ content[\%\ by\ mass] + 1.20 \times particle\ temperature\ during\ drying\ [K] + 3.29 \times drying\ time[hr] \quad \text{Formula (a):}$$

In formula (a), [η]CXIS represents the limiting viscosity of a CXIS component in the propylene-based polymer-containing particles, and the CXIS content represents the content of the CXIS component in the propylene-based polymer-containing particles.

Here, the CXIS (cold xylene insoluble part) component means a component insoluble in xylene. A CXS (cold xylene soluble part) component means a component soluble in xylene.

Specifically, the CXIS component refers to a component that is insoluble particularly in p-xylene among components contained in a measurement target (propylene-based polymer, propylene-based polymer-containing particles), and can be obtained by, for example, the following separation method. The CXS component refers to a residual component obtained by separating a CXIS component from a measurement target.

(Separation Method)

About 2 g of propylene-based polymer (propylene-based polymer-containing particles) is dissolved in boiled p-xylene for two hours to obtain a solution. Subsequently, the obtained solution is cooled to 20° C., and a solid precipitated in the cooled solution is obtained as a CXIS component.

A mass ratio of the CXIS component is preferably 20 to 100% by mass, more preferably 30 to 100% by mass, still more preferably 40 to 100% by mass, further still more preferably 50 to 100% by mass, and further still more preferably 60 to 100% by mass with respect to 100% by mass of the total mass of the polyolefin-containing particles.

Note that the limiting viscosity [η]CXIS of the CXIS component and the limiting viscosity [η]CXS of the CXS component can be measured by the limiting viscosity measurement method described above using any conventionally known suitable device.

(6) Median Diameter of Particles

The particles in the present embodiment preferably have a median diameter of 500 to 2000 μm.

In the present embodiment, the median diameter of the particles can be measured by a laser diffraction type particle diameter distribution measuring method or a sieve shaking type particle diameter distribution measuring method. These will be described below.

(Laser Diffraction Type Particle Diameter Distribution Measuring Method)

In the present embodiment, the median diameter of the particles can be measured using, for example, a laser diffraction type particle diameter distribution measuring device (for example, HELOS/KF, sample disperser: GRADIS+ VIBRI, manufactured by Sympatec GmbH).

Specifically, the volume-based median diameter ($D_{50}$) can be calculated by putting about 1 to 10 g of a sample of particles into a particle diameter distribution measuring device, measuring a particle diameter distribution, and analyzing the particle diameter distribution with analysis software (for example, WINDOX ver 5.3.1.0). The measurement may be further repeated three to five times for the sample, and an average value of the measured values may be taken as the average median diameter.

(Sieve Shaking Type Particle Diameter Distribution Measuring Method)

In the present embodiment, when the average median diameter of the particles is measured, the average median diameter may be calculated by measuring a particle diameter distribution by sieving in which the particles are sieved based on the particle diameter using gravity from a net stretched at a bottom of the sieve by shaking the sieve.

Specifically, the Method is as Follows.

First, sieves having different openings are stacked in several stages such that the sieves are stacked in descending order of the size of the opening from the top.

Subsequently, a sample is put into the uppermost sieve, then an operation of shaking all the sieves for five minutes is performed four times with a shaking width of 1.0 mm, and sieving can be thereby performed.

As the sieve, for example, a sieve having an opening of 5600 μm, 4750 μm, 4000 μm, 3350 μm, 2360 μm, 2000 μm, 1700 μm, 1400 μm, 1180 μm, 1000 μm, 850 μm, 710 μm, 500 μm, 300 μm, or 150 μm (JIS Z 8801, manufactured by Manabe Kogyo Co., Ltd.) can be used.

The sample amount only needs to be, for example, 100 g or more. As a sieve shaker, an electromagnetic sieve shaker AS200 manufactured by Retsch GmbH can be used.

The measurement can be performed by weighing the sample remaining on each sieve.

Specifically, the Method is as Follows.

The amount of the sample remaining on each sieve after shaking is weighed. Note that the amount of the sample remaining on each sieve is summed up in descending order of the size of the opening. Here, a sieve having a total value exceeding 50% of the total amount of the sample put into the sieve is defined as a sieve b. A sieve just above the sieve b is defined as a sieve a.

The average median diameter ($D_{50}$) can be calculated by the following formula based on the above measurement.

$$D_{50} = Da - [(Da-db) \times \{(xb-50)/(xb-xa)\}]$$

If more than 50% of the total amount of sample put into the sieve does not remain in any of the sieves, the sieve with the largest amount of remaining sample is defined as sieve b, and a sieve just above the sieve b is defined as a sieve a.

In the above formula, Da represents an opening [μm] of the sieve a, and db represents an opening [μm] of the sieve b. xa represents a mass ratio [% by mass] of the total amount of the sample remaining on the sieve a and the sieves above the sieve a with respect to the total sample amount, and xb represents a mass ratio [% by mass] of the total amount of the sample remaining on the sieve b and the sieves above the sieve b with respect to the total sample amount.

EXAMPLES

Hereinafter, the present invention will be described more specifically with reference to Examples. The present invention is not limited to the following Examples.

Measurement and evaluation methods in Examples and Comparative Examples are described below.

[Content of Ethylene Unit (Unit: % By Mass)]

The content of an ethylene unit in a heterophasic propylene polymerization material was determined by an IR spectrum method in accordance with IR spectrum measurement described on page 619 of Polymer Handbook (published by KINOKUNIYA COMPANY LTD., 1995).

Here, the "ethylene unit" means a monomer unit derived from ethylene. The content of an ethylene unit in an propylene-ethylene copolymer was determined by dividing the content of a monomer unit derived from ethylene in a heterophasic propylene polymerization material (referred to as the content of an ethylene unit) by a mass ratio of the propylene-ethylene copolymer in the heterophasic propylene polymerization material.

[Evaluation by Formula (a)]

(Separation Method)

About 2 g of propylene-based polymer (propylene-based polymer-containing particles) was dissolved in boiled p-xylene for two hours to obtain a solution. Subsequently, the obtained solution was cooled to 20° C., and a solid precipitated in the cooled solution was obtained as a CXIS component.

Predetermined parameters ([η]CXIS and CXIS content) were acquired based on the CXIS component obtained as described above, and whether or not a numerical value determined by applying these parameters to the above formula (a) was 441 or more and 600 or less was evaluated.

[Reference Example 1] (Production of Solid Catalyst Component)

An atmosphere in a flask having a volume of 100 mL and equipped with a stirrer, a dropping funnel, and a thermometer was replaced with a nitrogen gas, and then 36.0 mL of toluene and 22.5 mL of titanium tetrachloride were put into the flask and stirred to obtain a titanium tetrachloride solution. The temperature in the flask was set to 0° C., and then 1.88 g of magnesium diethoxide was put into the flask four times at intervals of 30 minutes at 0° C. Thereafter, the mixture was stirred at 0° C. for 1.5 hours.

Subsequently, 0.60 mL of ethyl 2-ethoxymethyl-3,3-dimethylbutanoate was put into the flask, and then the temperature in the flask was raised to 10° C.

Thereafter, the mixture was stirred at 10° C. for two hours, and 9.8 mL of toluene was put into the flask. Subsequently, the temperature in the flask was raised, and 3.15 mL of ethyl 2-ethoxymethyl-3,3-dimethylbutanoate was put into the flask when the temperature reached 60° C., and the temperature was further raised to 110° C. Subsequently, the mixture in the flask was stirred at 110° C. for three hours.

The obtained mixture was subjected to solid-liquid separation to obtain a solid. The obtained solid was washed three times with 56.3 mL of toluene at 100° C.

38.3 mL of toluene was added to the washed solid to form a slurry. To the obtained slurry, 15.0 mL of titanium tetrachloride and 0.75 mL of ethyl 2-ethoxymethyl-3,3-dimethylbutanoate were added to form a mixture, and the mixture was stirred at 110° C. for one hour. Thereafter, the stirred mixture was subjected to solid-liquid separation. The obtained solid was washed three times with 56.3 mL of toluene at 60° C., and further washed three times with 56.3 mL of hexane at normal temperature. The washed solid was dried under reduced pressure to obtain a solid catalyst component.

The obtained solid catalyst component had a titanium atom content of 2.53% by mass, an ethoxy group content of 0.44% by mass, and an internal electron donor content of 13.7% by mass.

A median diameter of the solid catalyst component measured by a laser diffraction/scattering method was 59.5 μm, and a cumulative percentage of the solid catalyst component in which a particle diameter was 10 μm or less in a volume-based particle diameter distribution was 5.3%.

The amount of a peak component of the solid catalyst component derived from an oxygen atom is orbital as measured by XPS analysis and having a peak position in a binding energy range of 532 to 534 eV was 85.0%, and the amount of a peak component of the obtained solid catalyst component derived from an oxygen atom is orbital as measured by XPS analysis and having a peak position in a binding energy range of 529 to 532 eV was 15.0%.

The total pore volume of the solid catalyst component as measured by a mercury intrusion method was 1.43 mL/g, the total volume of pores having a pore radius of 5 to 30 nm was 0.160 mL/g, the total volume of pores having a pore radius of 30 to 700 nm was 0.317 mL/g, and a specific surface area was 107.44 m$^2$/g.

[Example 1] (Production of Heterophasic Propylene Polymerization Material A)

<Preliminary Polymerization Step>

Into a stainless steel (SUS) autoclave having an internal volume of 3 L and equipped with a stirrer, 1.5 L of sufficiently dehydrated and deaerated n-hexane, 45 mmol of triethylaluminum (TEA), and 4.5 mmol of tert-butyl-n-propyldimethoxysilane were put.

Into the autoclave, 18 g of the solid catalyst component produced in the above Reference Example 1 was added, and then a preliminary polymerization step of continuously supplying 18 g of propylene over about 30 minutes while maintaining the temperature in the autoclave at about 10° C. was performed.

Thereafter, a slurry obtained by the preliminary polymerization step was transferred to a SUS 316L autoclave having an internal volume of 260 L and equipped with a stirrer, and 180 L of liquid butane was further added thereto to obtain a slurry.

<Main Polymerization Step>

In a main polymerization step, an apparatus in which a slurry polymerization reactor, a multi-stage gas phase polymerization reactor, and a gas phase polymerization reactor were disposed in series and connected to each other was used.

The main polymerization step was performed by polymerization steps 1-a, 1-b, and 2. Specifically, the main polymerization step was performed by producing a propylene-based polymer a which is a propylene homopolymer by polymerization in the polymerization steps 1-a and 1-b, transferring the produced propylene-based polymer a and a solid catalyst component to a polymerization reactor in the next stage without deactivating the produced propylene-based polymer a and the solid catalyst component, and producing a propylene copolymer b which is an propylene-ethylene copolymer by polymerization in the polymerization step 2. Hereinafter, the polymerization steps 1-a, 1-b, and 2 will be specifically described.

(Polymerization Step 1-a) (Homopolymerization of Propylene Using Slurry Polymerization Reactor)

Homopolymerization of propylene was performed using a vessel type slurry polymerization reactor made of SUS 304 and equipped with a stirrer.

Specifically, raw materials (propylene, hydrogen, solid catalyst component, TEA, and tert-butyl-n-propyldimethoxysilane) were continuously supplied to the reactor to perform a polymerization reaction. Reaction conditions were as follows.

Polymerization temperature: 50° C.
Stirring speed: 150 rpm
Liquid level in slurry polymerization reactor: 18 L
Supply amount of propylene: 25 kg/hour
Supply amount of hydrogen: 83.1 NL/hour
Supply amount of TEA: 28.4 mmol/hour
Supply amount of tert-butyl-n-propyldimethoxysilane: 5.53 mmol/hour
Supply amount of preliminary polymerization step slurry to reactor (in terms of solid catalyst component): 0.75 g/hour
Polymerization pressure: 3.56 MPa (gauge pressure)

A product (propylene homopolymer) sampled from an outlet of the slurry polymerization reactor had a limiting viscosity [η]L1 of 0.85 dL/g.

(Polymerization Step 1-b) (Homopolymerization of Propylene Using Multi-Stage Gas Phase Polymerization Reactor)

Homopolymerization of propylene was performed using a multi-stage gas phase polymerization reactor having six stages of reaction regions in the vertical direction, an uppermost stage of which was a fluidized bed and the remaining five stages were spouted beds.

Specifically, the slurry containing the particulate propylene homopolymer produced by the polymerization step 1-a and liquid propylene was transferred from the slurry polymerization reactor in the previous stage to the fluidized bed at the uppermost stage of the multi-staged gas phase polymerization reactor without being deactivated, and continuously supplied.

Inter-stage transfer of the propylene homopolymer in the multi-stage gas phase polymerization reactor was performed by a double valve method. The transfer by the double valve method was performed by connecting an upper reaction region (layer) to a lower reaction region with a 1-inch diameter pipe, disposing two on-off valves in the pipe, opening an upstream valve in a state where a downstream valve was closed, once storing a powder between the upper reaction region and the downstream valve, then closing the upstream valve, and then opening the downstream valve to transfer the particulate propylene homopolymer to the lower reaction region.

Propylene and hydrogen were continuously supplied from a lowermost side of the multi-staged gas phase polymerization reactor having the above configuration. In this way, homopolymerization of propylene was further performed while a fluidized bed or a spouted bed was formed in each reaction region of the multiple stages, the supply amounts of propylene and hydrogen were controlled so as to keep the gas composition and the pressure constant, and an excess gas was discharged. Reaction conditions were as follows.

Polymerization temperature: 70° C.
Polymerization pressure: 1.80 MPa (gauge pressure)
Concentration ratio of gas (hydrogen/(hydrogen propylene)):12.9 mol %

A product (propylene homopolymer) sampled from an outlet of the multi-stage gas phase polymerization reactor had a limiting viscosity $[\eta]G1$ of 0.83 dL/g. The values of $[\eta]L1$ and $[\eta]G1$ were almost the same. Therefore, in Example 1, the propylene homopolymer produced by performing up to the polymerization step 1-b is the propylene-based polymer a, and $[\eta]G1$ is the limiting viscosity of the propylene-based polymer a.

(Polymerization Step 2) (Propylene-Ethylene Copolymerization (Gas Phase Polymerization) Using Gas Phase Polymerization Reactor)

The propylene-based polymer a discharged from the multi-stage gas phase polymerization reactor used in the polymerization step 1-b was further continuously supplied to a gas phase polymerization reactor in the subsequent stage. The gas phase polymerization reactor used in the polymerization step 2 is a reactor equipped with a gas dispersion plate, and transfer of the particulate propylene-based polymer a from the multi-stage gas phase polymerization reactor in the previous stage to the gas phase polymerization reactor was performed by the double valve method described above.

While propylene, ethylene, and hydrogen were continuously supplied to the gas phase polymerization reactor having the above configuration, a gas supply amount was adjusted so as to keep the gas composition and the pressure constant, and an excess gas was discharged, copolymerization of propylene and ethylene was performed in the presence of the propylene-based polymer a to produce an propylene-ethylene copolymer which is the propylene copolymer b, thereby obtaining a heterophasic propylene polymerization material A which is a mixture of the propylene-based polymer a and the propylene copolymer b. Reaction conditions were as follows.

Polymerization temperature: 70° C.
Polymerization pressure: 1.75 MPa (gauge pressure)
Gas concentration ratio (ethylene/(propylene+ethylene)): 34.1 mol %
(hydrogen/(hydrogen+propylene+ethylene)): 3.2 mol %

A ratio (X) of the propylene copolymer b (propylene-ethylene copolymer) in the obtained heterophasic propylene polymerization material A was determined by measuring a crystal melting heat quantity of each of the propylene-based polymer a and the whole heterophasic propylene polymerization material A, and performing calculation using the following formula. Here, the crystal melting heat quantity was measured by differential scanning calorimetry (DSC).

$$X=1-(\Delta Hf)T/(\Delta Hf)P$$

$(\Delta Hf)T$: melting heat quantity [J/g] of the whole heterophasic propylene polymerization material A.
$(\Delta Hf)P$: melting heat quantity [J/g] of propylene-based polymer a A product (heterophasic propylene polymerization material A) sampled from an outlet of the gas phase polymerization reactor had a limiting viscosity $[\eta]G2$ of 1.36 dL/g.

From the above, a limiting viscosity $[\eta]C$ of the propylene copolymer b was calculated by the following formula.

$$[\eta]C=([\eta]G2-[\eta]G1\times(1-X))/X$$

The obtained heterophasic propylene polymerization material A had a limiting viscosity ($[\eta]$Total) of 1.36 dL/g, and an ethylene unit content of 11.5% by mass. A polymerization ratio between the propylene-based polymer a and the propylene copolymer b was 72/28 ([% by mass/% by mass]). The propylene copolymer b had an ethylene content of 42% by mass, and had a limiting viscosity $[\eta]C$ of 2.8 dL/g.

<Solid-Gas Separation Step and Catalyst Deactivation Step>

By transferring the heterophasic propylene polymerization material A obtained in the above polymerization step 2 from the gas phase polymerization reactor to a SUS solid-gas separation container, and supplying water vapor (steam) and a nitrogen gas from a bottom side of the solid-gas separation container, a catalyst deactivation step of deactivating a solid catalyst component was performed together with a solid-gas separation step.

<Preliminary Drying Step>

The heterophasic propylene polymerization material A that had been subjected to the solid-gas separation step and the catalyst deactivation step as described above was transferred to a SUS drying container, a nitrogen gas was supplied as a drying gas into the drying container, and a batch type preliminary drying step was performed under the following conditions.

Temperature of heterophasic propylene polymerization material A supplied to drying container: 40° C.
Temperature of nitrogen gas supplied: 80° C. (353.15 K)
Flow rate of nitrogen gas supplied: 0.8 kg/kg
Superficial velocity of nitrogen gas: 0.025 m/s
Temperature of heterophasic propylene polymerization material A: 53° C.
Drying time: one hour <Granulation Step>

Using a twin screw extruder (TEX44αII) manufactured by The Japan Steel Works, Ltd. as a granulator, the heterophasic propylene polymerization material A that had been subjected to the preliminary drying step as described above and the raw material components presented in Table 2 below were mixed at a ratio presented in Table 2 below under the granulating conditions presented in Table 1 below to be granulated into pellets, thus obtaining propylene-based polymer-containing particles A (hereinafter, simply referred to as particles A). Note that the physical properties of the obtained particles A are presented in Table 3 below. The amount of the volatile organic compound presented in Table 1 is the amount of the volatile organic compound in the heterophasic propylene polymerization material A before granulation, and the amount of the volatile organic compound presented in Table 3 is the amount of the volatile organic compound in the particles A obtained by granulation.

TABLE 1

| Granulator | [–] | Twin screw extruder |
|---|---|---|
| Number of vents | [Number] | 2 (atmospheric vent) |
| Rotation speed | [rpm] | 280 |
| Amount of volatile organic compound in heterophasic propylene polymerization material A | [ppm by mass] | 570 |
| Outlet temperature | [° C.] | 180 |

TABLE 2

| Raw material component | Ratio [% by mass] |
|---|---|
| Heterophasic propylene polymerization material A | 99 35 |
| Neutralizing agent | 0.05 |
| Nucleating agent | 0.10 |
| Antioxidant | 0.10 |
| Antistatic agent | 0.30 |
| Weather-resistant agent | 0.05 |
| Light-resistant agent | 0.05 |

TABLE 3

| | | Particles A |
|---|---|---|
| Content of CXS | [% by mass] | 23.3 |
| Content of CXIS | [% by mass] | 76.7 |
| [η] whole | [dL/g] | 1.4 |
| [η] CXS | [dL/g] | 2.3 |
| [η] CXIS | [dL/g] | 1.1 |
| Content of ethylene unit | [% by mass] | 11.5 |
| Average median diameter (sieve shaking type particle diameter distribution measuring method) | [μm] | 3063 |
| Amount of volatile organic compound | [ppm by mass] | 330 |

<Main drying step>

The obtained particles A were put into the drying container described above with reference to the FIGURE, and subjected to the main drying step by a batch method under the conditions presented in Table 10 below.

(Measurement of Amount of Volatile Organic Compound)

The amount of the volatile organic compound was measured using HS-GC/FID under the following conditions. Specifically, components detected for 10 minutes were quantified in terms of normal heptane, and a total value thereof was taken as the amount of the volatile organic compound. Note that the amount of the volatile organic compound is represented by a mass ratio [ppm by mass] with respect to the particles A.

HS Conditions

Measuring device: head space sampler HS-20 (manufactured by Shimadzu Corporation)

Heating temperature/time: 120° C./60 min

Sample amount: 1.0 g

GC Conditions

Measuring device: gas chromatograph GC-2010PlusAF (manufactured by Shimadzu Corporation)

Column: DB-WAX 0.53 mm×60 m×1.0 μm

Oven: A gas phase portion was injected at 50° C., and the temperature was raised to 100° C. at a temperature rising rate of 5° C./min, further raised to 230° C. at a temperature rising rate of 20° C./min, and held for five minutes.

Detector: hydrogen flame ionization detector (230° C.)

As a result, as presented in Table 10 below, in the particles A according to Example 1 after being subjected to the main drying step, the amount of the volatile organic compound was significantly reduced. In Table 10, the "amount of the volatile organic compound before drying" is the amount of the volatile organic compound before the main drying step is performed, and the "amount of the volatile organic compound after drying" is the amount of the volatile organic compound after the main drying step is performed. In Table 10, the "reduction ratio" is a value obtained by dividing a difference between the "amount of the volatile organic compound before drying" and the "amount of the volatile organic compound after drying" by the "amount of the volatile organic compound before drying", and multiplying the result by 100.

(Amount of Air with Respect to Particles)

The mass of air used was calculated by multiplying the amount of air supplied to the particles [m$^3$] by a density at each drying temperature.

(Adhesion Ratio)

The polyolefin-containing particles after the main drying step were sieved with a sieve having a sieve mesh of 4 mm. An adhesion ratio is represented by a mass ratio (% by mass) of the polyolefin-containing particles that did not pass through the sieve with respect to 100% by mass of the total amount of the polyolefin-containing particles put into the sieve.

Examples 2 to 6 and Comparative Example 1

Examples 2 to 6 and Comparative Example 1 were performed in a similar manner to Example 1 except that the conditions of the main drying step were as illustrated in Table 10 below. Results thereof are presented in Table 10 below.

[Example 7] (Production of Heterophasic Propylene Polymerization Material B)

<Preliminary Polymerization Step>

Into a SUS autoclave having an internal volume of 3 L and equipped with a stirrer, 1.5 L of sufficiently dehydrated and deaerated n-hexane, 44 mmol of TEA, and 4.4 mmol of tert-butyl-n-propyldimethoxysilane were put.

Into the autoclave, 17 g of the solid catalyst component produced in the above Reference Example 1 was added, and then a preliminary polymerization step of continuously supplying 17 g of propylene over about 30 minutes while maintaining the temperature in the autoclave at about 10° C. was performed.

Thereafter, a slurry obtained by the preliminary polymerization step was transferred to a SUS 316L autoclave having an internal volume of 260 L and equipped with a stirrer, and 180 L of liquid butane was further added thereto to obtain a slurry.

<Main Polymerization Step>

In a main polymerization step, an apparatus in which a slurry polymerization reactor, a multi-stage gas phase polymerization reactor, and a gas phase polymerization reactor were disposed in series and connected to each other was used.

The main polymerization step was performed by polymerization steps 1-a, 1-b, and 2. Specifically, the main polymerization step was performed by producing a propylene-based polymer a which is a propylene homopolymer by polymerization in the polymerization steps 1-a and 1-b, transferring the produced propylene-based polymer a and a solid catalyst component to a polymerization reactor in the next stage without deactivating the produced propylene-based polymer a and the solid catalyst component, and producing a propylene copolymer b which is an propylene-ethylene copolymer by polymerization in the polymerization step 2. Hereinafter, the polymerization steps 1-a, 1-b, and 2 will be specifically described.

(Polymerization Step 1-a) (Homopolymerization of Propylene Using Slurry Polymerization Reactor)

Homopolymerization of propylene was performed using a vessel type slurry polymerization reactor made of SUS 304 and equipped with a stirrer.

Specifically, a raw material was continuously supplied to the reactor to perform a polymerization reaction. Reaction conditions were as follows.

Polymerization temperature: 50° C.
Stirring speed: 150 rpm
Liquid level in slurry polymerization reactor: 18 L
Supply amount of propylene: 25 kg/hour
Supply amount of hydrogen: 70.4 NL/hour
Supply amount of TEA: 27.5 mmol/hour
Supply amount of tert-butyl-n-propyldimethoxysilane: 5.46 mmol/hour
Supply amount of slurry (in terms of solid catalyst component): 0.73 g/hour
Polymerization pressure: 3.50 MPa (gauge pressure)

A product (propylene homopolymer) sampled from an outlet of the slurry polymerization reactor had a limiting viscosity $[\eta]L1$ of 0.96 dL/g.

(Polymerization Step 1-b) (Homopolymerization of Propylene Using Multi-Stage Gas Phase Polymerization Reactor)

Homopolymerization of propylene was performed using a multi-stage gas phase polymerization reactor having six stages of reaction regions in the vertical direction, an uppermost stage of which was a fluidized bed and the remaining five stages were spouted beds.

Specifically, the slurry containing the particulate polypropylene produced by the polymerization step 1-a and liquid propylene was transferred from the slurry polymerization reactor in the previous stage to the fluidized bed at the uppermost stage of the multi-staged gas phase polymerization reactor without being deactivated, and continuously supplied.

Inter-stage transfer of the propylene homopolymer in the multi-stage gas phase polymerization reactor was performed by the double valve method described above.

Propylene and hydrogen were continuously supplied from a lower portion of the multi-stage gas phase polymerization reactor having the above configuration. In this way, homopolymerization of propylene was further performed while a fluidized bed or a spouted bed was formed in each reaction region, the supply amounts of propylene and hydrogen were controlled so as to keep the gas composition and the pressure constant, and an excess gas was discharged. Reaction conditions were as follows.

Polymerization temperature: 59° C.
Polymerization pressure: 1.80 MPa (gauge pressure)
Concentration ratio of gas (hydrogen/(hydrogen propylene)):10.2 mol %

A product (propylene homopolymer) sampled from an outlet of the multi-stage gas phase polymerization reactor had a limiting viscosity $[\eta]G1$ of 0.92 dL/g. The values of $[\eta]L1$ and $[\eta]G1$ were almost the same. Therefore, in Example 7, the propylene homopolymer produced by performing up to the polymerization step 1-b is the propylene-based polymer a, and $[\eta]G1$ is the limiting viscosity of the propylene-based polymer a.

(Polymerization Step 2) (Propylene-Ethylene Copolymerization (Gas Phase Polymerization) Using Gas Phase Polymerization Reactor)

The propylene-based polymer a discharged from the multi-stage gas phase polymerization reactor used in the polymerization step 1-b was further continuously supplied to a gas phase polymerization reactor in the subsequent stage. The gas phase polymerization reactor used in the polymerization step 2 is a reactor equipped with a gas dispersion plate, and transfer of the particulate propylene-based polymer a from the multi-stage gas phase polymerization reactor in the previous stage to the gas phase polymerization reactor was performed by the double valve method described above.

While propylene, ethylene, and hydrogen were continuously supplied to the gas phase polymerization reactor having the above configuration, a gas supply amount was adjusted so as to keep the gas composition and the pressure constant, and an excess gas was discharged, copolymerization of propylene and ethylene was performed in the presence of the propylene-based polymer a to produce an propylene-ethylene copolymer which is the propylene copolymer b, thereby obtaining a heterophasic propylene polymerization material B which is a mixture of the propylene-based polymer a and the propylene copolymer b. Reaction conditions were as follows.

Polymerization temperature: 70° C.
Polymerization pressure: 1.75 MPa (gauge pressure)
Gas concentration ratio (ethylene/(propylene+ethylene)): 41.7 mol %
(hydrogen/(hydrogen+propylene+ethylene)): 3.1 mol %

A ratio (X) of the propylene copolymer b (propylene-ethylene copolymer) in the obtained heterophasic propylene polymerization material B was determined by measuring a crystal melting heat quantity of each of the propylene-based polymer a and the whole heterophasic propylene polymerization material B, and performing calculation using the following formula. Here, the crystal melting heat quantity was measured by differential scanning calorimetry (DSC).

$$X=1-(\Delta Hf)T/(\Delta Hf)P$$

(ΔHf)T: melting heat quantity [J/g] of the whole heterophasic propylene polymerization material B.
(ΔHf) P: melting heat quantity [J/g] of propylene-based polymer a A product (heterophasic propylene polymerization material B) sampled from an outlet of the gas phase polymerization reactor had a limiting viscosity [η]G2 of 1.93 dL/g.

From the above, a limiting viscosity [η]C of the propylene copolymer b was calculated by the following formula.

$$[\eta]C = ([\eta]G2 - [\eta]G1 \times (1-X))/X$$

The obtained heterophasic propylene polymerization material B had a limiting viscosity ([η]Total) of 1.93 dL/g, and an ethylene unit content of 22.4% by mass. A polymerization ratio between the propylene-based polymer a and the propylene copolymer b was 50/50 ([by mass/% by mass]). The propylene copolymer b had an ethylene content of 44% by mass, and had a limiting viscosity [η]C of 2.9 dL/g.

<Solid-Gas Separation Step and Catalyst Deactivation Step>

By transferring the heterophasic propylene polymerization material B obtained in the above polymerization step 2 from the gas phase polymerization reactor to a SUS solid-gas separation container, and supplying water vapor (steam) and a nitrogen gas from a bottom side of the solid-gas separation container, a catalyst deactivation step of deactivating a solid catalyst component was performed together with a solid-gas separation step.

<Preliminary Drying Step>

The heterophasic propylene polymerization material B that had been subjected to the solid-gas separation step and the catalyst deactivation step as described above was transferred to a SUS drying container, a nitrogen gas was supplied as a drying gas into the drying container, and a batch type preliminary drying step was performed under the following conditions.

Temperature of heterophasic propylene polymerization material B supplied to drying container: 40° C.

Temperature of nitrogen gas supplied: 80° C.

Flow rate of nitrogen gas: 0.8 kg/kg

Superficial velocity of nitrogen gas: 0.025 m/s

Temperature of heterophasic propylene polymerization material B: 53° C.

Drying time: one hour

<Granulation Step>

Using a twin screw extruder manufactured by The Japan Steel Works, Ltd. as a granulator, the heterophasic propylene polymerization material B that had been subjected to the preliminary drying step as described above and the raw material components presented in Table 5 below were mixed at a ratio presented in Table 5 below under the granulating conditions presented in Table 4 below to be granulated into pellets, thus obtaining propylene-based polymer-containing particles B (hereinafter, simply referred to as particles B). Note that the physical properties of the obtained particles B are presented in Table 6 below. The amount of the volatile organic compound presented in Table 4 is the amount of the volatile organic compound in the heterophasic propylene polymerization material B before granulation, and the amount of the volatile organic compound presented in Table 6 is the amount of the volatile organic compound in the particles B obtained by granulation.

TABLE 4

| Granulator | [—] | Twin screw extruder |
|---|---|---|
| Number of vents | [Number] | 1 (atmospheric vent) |

TABLE 4-continued

| Rotation speed | [rpm] | 300 |
|---|---|---|
| Amount of volatile organic compound in heterophasic propylene polymerization material B | [ppm by mass] | 190 |
| Outlet temperature | [° C.] | Setting 200 |

TABLE 5

| Raw material component | Ratio [% by mass] |
|---|---|
| Heterophasic propylene polymerization material B | 88.25 |
| Polyolefin elastomer | 10.00 |
| Antioxidant | 0.20 |
| Light-resistant agent | 0.30 |
| HALS | 0.10 |
| Lubricant | 0.10 |
| Adsorbent | 0.20 |
| Wax | 0.10 |
| Polyethylene fine powder | 0.25 |
| Lubricant | 0.50 |

TABLE 6

| | | Particles B |
|---|---|---|
| Content of CXS | [% by mass] | 40.9 |
| Content of CXIS | [% by mass] | 59.1 |
| [η] whole | [dL/g] | 1.7 |
| [η] CXS | [dL/g] | 2.1 |
| [η] CXIS | [dL/g] | 1.5 |
| Content of ethylene unit | [% by mass] | 22.4 |
| Average median diameter (sieve shaking type particle diameter distribution measuring method) | [μm] | 2855 |
| Amount of volatile organic compound | [ppm by mass] | 180 |

<Main drying step>

The obtained particles B were put into the drying container described above with reference to the FIGURE, and subjected to the main drying step by a batch method under the conditions presented in Table 10 below.

(Measurement of Amount of Volatile Organic Compound)

The amount of the volatile organic compound was measured in a similar manner to Example 1 using the particles B dried as described above.

As a result, as presented in Table 10 below, in the particles B according to Example 7 after being subjected to the main drying step, the amount of the volatile organic compound was significantly reduced.

Examples 8 to 11 and Comparative Example 2

Examples 8 to 11 and Comparative Example 2 were performed in a similar manner to Example 7 except that the conditions of the main drying step were as illustrated in Table 10 below. Results thereof are presented in Table 10 below.

[Example 12] (Production of Propylene Homopolymer C)

<Preliminary Polymerization Step>

Into a SUS autoclave having an internal volume of 3 L and equipped with a stirrer, 1.5 L of sufficiently dehydrated and deaerated n-hexane, 45 mmol of TEA, and 4.5 mmol of tert-butyl-n-propyldimethoxysilane were put.

Into the autoclave, 18 g of the solid catalyst component produced in the above Reference Example 1 was added, and then a preliminary polymerization step of continuously supplying 18 g of propylene over about 30 minutes while maintaining the temperature in the autoclave at about 10° C. was performed.

Thereafter, a slurry obtained by the preliminary polymerization step was transferred to a SUS 316L autoclave having an internal volume of 260 L and equipped with a stirrer, and 180 L of liquid butane was further added thereto to obtain a slurry.

<Main Polymerization Step>

In a main polymerization step, an apparatus in which a slurry polymerization reactor, a multi-stage gas phase polymerization reactor, and a gas phase polymerization reactor were disposed in series and connected to each other was used. Specifically, the propylene-based polymer a which is a propylene homopolymer was produced by polymerization in the following polymerization steps 1-a and 1-b, and a propylene homopolymer C was further produced by polymerization in the following polymerization step 1-c.

(Polymerization Step 1-a) (Homopolymerization of Propylene Using Slurry Polymerization Reactor)

Homopolymerization of propylene was performed using a vessel type slurry polymerization reactor made of SUS 304 and equipped with a stirrer.

Specifically, a raw material was continuously supplied to the reactor to perform a polymerization reaction. Reaction conditions were as follows.

Polymerization temperature: 50° C.
Stirring speed: 150 rpm
Liquid level in reactor: 18 L
Supply amount of propylene: 25 kg/hour
Supply amount of hydrogen: 160 NL/hour
Supply amount of TEA: 24.0 mmol/hour
Supply amount of tert-butyl-n-propyldimethoxysilane: 4.55 mmol/hour
Supply amount of slurry (in terms of solid catalyst component): 0.71 g/hour
Polymerization pressure: 4.00 MPa (gauge pressure)

A product (propylene homopolymer) sampled from an outlet of the slurry polymerization reactor had a limiting viscosity $[\eta]L1$ of 0.68 dL/g.

(Polymerization Step 1-b) (Homopolymerization (Gas Phase Polymerization) of Propylene Using Multi-Stage Gas Phase Polymerization Reactor)

Homopolymerization of propylene was performed using a multi-stage gas phase polymerization reactor having six stages of reaction regions in the vertical direction, an uppermost stage of which was a fluidized bed and the remaining five stages were spouted beds.

Specifically, the slurry containing the particulate propylene homopolymer produced by the polymerization step 1-a and liquid propylene was transferred from the slurry polymerization reactor in the previous stage to the fluidized bed at the uppermost stage of the multi-staged gas phase polymerization reactor without being deactivated, and continuously supplied.

Inter-stage transfer of the propylene homopolymer in the multi-stage gas phase polymerization reactor was performed by the double valve method described above.

Propylene and hydrogen were continuously supplied from a lowermost side of the multi-staged gas phase polymerization reactor having the above configuration. In this way, homopolymerization of propylene was further performed while a fluidized bed or a spouted bed was formed in each reaction region of the multiple stages, the supply amounts of propylene and hydrogen were controlled so as to keep the gas composition and the pressure constant, and an excess gas was discharged. Reaction conditions were as follows.

Polymerization temperature: 80° C.
Polymerization pressure: 1.79 MPa (gauge pressure)
Concentration ratio of gas (hydrogen/(hydrogen propylene)):18.3 mol %

A product (propylene homopolymer) sampled from an outlet of the multi-stage gas phase polymerization reactor had a limiting viscosity $[\eta]G1$ of 0.64 dL/g. The values of $[\eta]L1$ and $[\eta]G1$ were almost the same. Therefore, the propylene homopolymer produced by performing up to the polymerization step 1-b is the propylene-based polymer a, and $[\eta]G1$ is the limiting viscosity of the propylene-based polymer a.

(Polymerization Step 1-c) (Homopolymerization (Gas Phase Polymerization) of Propylene Using Gas Phase Polymerization Reactor)

The propylene-based polymer a discharged from the multi-stage gas phase polymerization reactor in the previous stage was continuously supplied to a gas phase polymerization reactor in the next stage. This gas phase polymerization reactor is a reactor equipped with a gas dispersion plate, and transfer of the particulate propylene-based polymer a from the multi-stage gas phase polymerization reactor in the previous stage to the gas phase polymerization reactor was performed by the double valve method described above.

While propylene and hydrogen were continuously supplied to the gas phase polymerization reactor having the above configuration, a gas supply amount was adjusted so as to keep the gas composition and the pressure constant, and an excess gas was discharged, homopolymerization of propylene was performed in the presence of the propylene-based polymer a to produce a propylene homopolymer which is a propylene-based polymer b, thereby obtaining a propylene homopolymer C which is a mixture of the propylene-based polymer a and the propylene-based polymer b. Reaction conditions were as follows.

Polymerization temperature: 79° C.
Polymerization pressure: 1.76 MPa (gauge pressure)
Concentration ratio of gas (hydrogen/(hydrogen propylene)):0.14 mol %

The propylene homopolymer C had a limiting viscosity $([\eta]Total)$ of 0.99 dL/g.

<Solid-Gas Separation Step and Catalyst Deactivation Step>

By transferring the propylene homopolymer C obtained in the above polymerization step 1-c from the gas phase polymerization reactor to a SUS solid-gas separation container, and supplying water vapor (steam) and a nitrogen gas from a bottom side of the solid-gas separation container, a catalyst deactivation step of deactivating a solid catalyst component was performed together with a solid-gas separation step.

<Preliminary Drying Step>

The propylene homopolymer C that had been subjected to the solid-gas separation step and the catalyst deactivation step as described above was transferred to a SUS drying container, a nitrogen gas was supplied as a drying gas into the drying container, and a batch type preliminary drying step was performed under the following conditions.

Temperature of propylene homopolymer C supplied to drying container: 40° C.
Temperature of nitrogen gas supplied: 80° C. (353.15 K)
Flow rate of nitrogen gas: 0.8 kg/kg
Superficial velocity of nitrogen gas: 0.025 m/s
Temperature of propylene homopolymer C: 53° C.
Drying time: one hour <Granulation Step>

Using a twin screw extruder manufactured by The Japan Steel Works, Ltd. as a granulator, the propylene homopolymer C that had been subjected to the preliminary drying step as described above and the raw material components presented in Table 8 below were mixed at a ratio presented in Table 8 below under the granulating conditions presented in Table 7 below to be granulated into pellets, thus obtaining propylene-based polymer-containing particles C (hereinafter, simply referred to as particles C). Note that the physical properties of the obtained particles C are presented in Table 9 below. The amount of the volatile organic compound presented in Table 7 is the amount of the volatile organic compound in the propylene homopolymer C before granulation, and the amount of the volatile organic compound presented in Table 9 is the amount of the volatile organic compound in the particles C obtained by granulation.

TABLE 7

| Granulator | [—] | Twin screw extruder |
|---|---|---|
| Number of vents | [Number] | 2 (atmospheric vent) |
| Rotation speed | [rpm] | 280 |
| Amount of volatile organic compound in propylene homopolymer C | [ppm by mass] | 450 |
| Outlet temperature | [° C.] | 180 |

TABLE 8

| Raw material component | Ratio [ by mass] |
|---|---|
| Propylene homopolymer C | 99.75 |
| Neutralizing agent | 0.05 |
| Antioxidant | 0.20 |

TABLE 9

|  |  | Particles C |
|---|---|---|
| Content of CXS | [% by mass] | 0.2 |
| Content of CXIS | [% by mass] | 99.8 |
| [η] whole | [dL/g] | 1.0 |
| [η] CXS | [dL/g] | Detection limit * |
| [η] CXIS | [dL/g] | 1.0 |
| Content of ethylene unit | [% by mass] | 0.0 |

TABLE 9-continued

|  |  | Particles C |
|---|---|---|
| Average median diameter (sieve shaking type particle diameter distribution measuring method) | [μm] | 2853 |
| Amount of volatile organic compound | [ppm by mass] | 210 |

* Since the amount of CXS was too small, [η] CXS could not be measured.

<Main drying step>

The obtained particles C were put into the drying container described above with reference to the FIGURE, and subjected to the main drying step by a batch method under the conditions presented in Table 10 below.

(Measurement of Amount of Volatile Organic Compound)

The amount of the volatile organic compound was measured in a similar manner to Example 1 using the particles C dried as described above.

As a result, as presented in Table 10 below, in the particles C according to Example 12 after being subjected to the main drying step, the amount of the volatile organic compound was significantly reduced.

Example 13 and Comparative Examples 3 and 4

Example 13 and Comparative Examples 3 and 4 were performed in a similar manner to Example 12 except that the conditions of the main drying step were as illustrated in Table 10 below. Results thereof are presented in Table 10 below.

Example 14

Example 14 was performed in a similar manner to Example 7 except that the conditions of the main drying step were as illustrated in Table 10 below. Results thereof are presented in Table 10 below. An adhesion ratio of the polyolefin-containing particles after the main drying step was 5.6% by mass, which indicates very slight adhesion and did not cause a problem in process operation.

Comparative Example 6

Comparative Example 6 was performed in a similar manner to Example 7 except that the conditions of the main drying step were as illustrated in Table 10 below. Results thereof are presented in Table 10 below. An adhesion ratio of the polyolefin-containing particles after the main drying step was 76.4% by mass, and the polyolefin-containing particles after the main drying step formed a coarse adhesion mass, which caused a problem in process operation.

TABLE 10

|  | Particles [—] | Particle temperature when particles are put into drying container [° C.] | Particle temperature during drying [° C.] | Drying time [hr] | Amount of air with respect to particles [kg/kg] | Superficial velocity of air in drying container *1 [m/s] | Amount of volatile organic compound before drying [ppm by mass] | Amount of volatile organic compound after drying [ppm by mass] | Reduction ratio [% by mass] | Formula (a) | Adhesion ratio [% by mass] |
|---|---|---|---|---|---|---|---|---|---|---|---|
| Example 1 | Particles A | 25 | 60 | 15 | 40.6 | 0.007 | 260 | 130 | 50 | 453 | 0 |
| Example 2 | Particles A | 25 | 80 | 10 | 25.5 | 0.007 | 250 | 59 | 76 | 460 | 0 |
| Example 3 | Particles A | 25 | 80 | 15 | 38.3 | 0.007 | 250 | 39 | 84 | 477 | 0 |
| Example 4 | Particles A | 25 | 100 | 3 | 7.3 | 0.007 | 270 | 76 | 72 | 461 | 0 |
| Example 5 | Particles A | 25 | 100 | 5 | 12.1 | 0.007 | 270 | 39 | 86 | 468 | 0 |
| Example 6 | Particles A | 25 | 100 | 15 | 36.3 | 0.007 | 270 | 5 | 98 | 501 | 0 |
| Example 7 | Particles B | 25 | 60 | 15 | 40.6 | 0.007 | 110 | 21 | 81 | 476 | 0 |
| Example 8 | Particles B | 25 | 80 | 3 | 7.7 | 0.007 | 100 | 32 | 68 | 460 | 0 |
| Example 9 | Particles B | 25 | 80 | 5 | 12.8 | 0.007 | 100 | 16 | 84 | 467 | 0 |

TABLE 10-continued

|  | Particles [—] | Particle temperature when particles are put into drying container [° C.] | Particle temperature during drying [° C.] | Drying time [hr] | Amount of air with respect to particles [kg/kg] | Superficial velocity of air in drying container *1 [m/s] | Amount of volatile organic compound before drying [ppm by mass] | Amount of volatile organic compound after drying [ppm by mass] | Reduction ratio [% by mass] | Formula (a) | Adhesion ratio [% by mass] |
|---|---|---|---|---|---|---|---|---|---|---|---|
| Example 10 | Particles B | 25 | 80 | 10 | 25.5 | 0.007 | 100 | 4 | 96 | 483 | 0 |
| Example 11 | Particles B | 25 | 80 | 15 | 38.3 | 0.007 | 100 | 1 | 99 | 500 | 0 |
| Example 12 | Particles C | 25 | 100 | 10 | 24.2 | 0.007 | 200 | 28 | 86 | 469 | 0 |
| Example 13 | Particles C | 25 | 100 | 15 | 36.3 | 0.007 | 200 | 21 | 90 | 486 | 0 |
| Example 14 | Particles B | 25 | 150 | 6 | 14.5 | 0.007 | 28 | 1 | 96 | 554 | 5.6 |
| Comparative Example 1 | Particles A | 25 | 60 | 3 | 8.1 | 0.007 | 260 | 200 | 23 | 413 | 0 |
| Comparative Example 2 | Particles B | 25 | 60 | 1 | 2.7 | 0.007 | 110 | 90 | 18 | 430 | 0 |
| Comparative Example 3 | Particles C | 25 | 100 | 1 | 2.4 | 0.007 | 200 | 160 | 20 | 440 | 0 |
| Comparative Example 4 | Particles C | 25 | 60 | 3 | 8.1 | 0.007 | 210 | 180 | 14 | 398 | 0 |
| Comparative Example 5 | Particles C | 25 | 60 | 15 | 40.6 | 0.007 | 210 | 160 | 24 | 438 | 0 |
| Comparative Example 6 | Particles B | 25 | 140 | 24 | 58.0 | 0.007 | 28 | 1 | 96 | 601 | 76.4 |

*1 The superficial velocity of air was defined as the velocity of air in a cross section obtained by cutting the cylindrical portion of the drying container in a direction orthogonal to the extending direction of the cylindrical portion in the air flowing direction.

What is claimed is:

1. A method for drying polyolefin-containing particles, the method comprising a drying step of supplying polyolefin-containing particles to a drying container, supplying a drying gas to the drying container, and drying the polyolefin-containing particles in the drying container, wherein $$38.0 \times [\eta]CXIS[dL/g] - 0.500 \times CXIS \text{ content}[\% \text{ by mass}] + 1.20 \times \text{particle temperature during drying}[K] + 3.29 \times \text{drying time}[hr] \quad \text{Formula (a)}:$$

wherein in formula (a),
CXIS means cold xylene insoluble,
$[\eta]$CXIS represents a limiting viscosity of a CXIS component in the polyolefin-containing particles, and
the CXIS content represents a content of a CXIS component in the polyolefin-containing particles.

2. The method for drying polyolefin-containing particles according to claim 1, wherein a ratio of an amount of the drying gas to an amount of the particles supplied to the drying container (amount of drying gas [kg]/amount of particles [kg]) is 0.1 or more and 100 or less.

3. The method for drying polyolefin-containing particles according to claim 1, wherein the particles are pellet-shaped particles.

4. The method for drying polyolefin-containing particles according to claim 1, wherein the particles supplied into the drying container have a temperature of 25° C. or higher and 200° C. or lower.

5. The method for drying polyolefin-containing particles according to claim 1, wherein the gas supplied to the drying container has a superficial velocity of 0.5 cm/s or more and 100 cm/s or less.

6. The method for drying polyolefin-containing particles according to claim 1, further comprising a granulation step of granulating the particles by a granulator including one or more vents before performing the drying step.

7. The method for drying polyolefin-containing particles according to claim 6, further comprising a preliminary drying step before performing the granulation step.

8. The method for drying polyolefin-containing particles according to claim 7, performed by setting conditions such that
drying time in the preliminary drying step is at least 0.01 times drying time in the drying step,
a particle temperature in the preliminary drying step is at least 0.5 times a particle temperature [K] during drying in the drying step, and
a ratio of an amount of the drying gas to an amount of the particles supplied in the preliminary drying step (amount of drying gas [kg]/amount of particles [kg]) is at least 0.1 times a ratio of the amount of the drying gas to the amount of the particles supplied in the drying step (amount of drying gas [kg]/amount of particles [kg]).

9. The method for drying polyolefin-containing particles according to claim 1, wherein the polyolefin is a propylene-based polymer.

10. A method for producing a polyolefin, comprising a step of drying polyolefin-containing particles by the drying method according to claim 1.

* * * * *